United States Patent
Allais et al.

(10) Patent No.: US 8,134,072 B2
(45) Date of Patent: Mar. 13, 2012

(54) SYSTEM HAVING A SUPERCONDUCTIVE CABLE

(75) Inventors: Arnaud Allais, Saint Julien (FR); Frank Schmidt, Langenhagen (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 11/801,583

(22) Filed: May 10, 2007

(65) Prior Publication Data

US 2008/0083546 A1    Apr. 10, 2008

(30) Foreign Application Priority Data

Jun. 7, 2006 (EP) .................................... 06290934

(51) Int. Cl.
*H01B 12/00* (2006.01)

(52) U.S. Cl. .................. 174/125.1; 174/15.5; 29/599

(58) Field of Classification Search .............. 174/15.5, 174/125.1; 505/232, 239; 29/599
See application file for complete search history.

(56) References Cited

U.S. PATENT DOCUMENTS

| | | | | |
|---|---|---|---|---|
| 3,612,742 A | * | 10/1971 | Snowden et al. ............ | 174/15.5 |
| 5,436,606 A | * | 7/1995 | Cottevieille et al. .......... | 335/216 |
| 6,596,945 B1 | * | 7/2003 | Hughey et al. .............. | 174/125.1 |
| 7,091,423 B2 | * | 8/2006 | Yumura et al. .............. | 174/125.1 |
| 2004/0256126 A1 | * | 12/2004 | Ashibe et al. ................ | 174/15.5 |
| 2005/0056456 A1 | * | 3/2005 | Ladie' et al. ................ | 174/125.1 |
| 2005/0067174 A1 | * | 3/2005 | Suzawa et al. ............... | 174/15.5 |

FOREIGN PATENT DOCUMENTS

WO    WO03/052775    6/2003

* cited by examiner

*Primary Examiner* — Dean A. Reichard
*Assistant Examiner* — Andargie M Aychillhum
(74) *Attorney, Agent, or Firm* — Sofer & Haroun, LLP

(57) ABSTRACT

A superconductive cable includes a superconductive conductor (2), a dielectric (3) enclosing the latter and a superconductive screen (4) arranged over the dielectric acting as a spacer. The cable is enclosed with the inclusion of an air gap by a cryostat (7) which consists of a metal inner tube (8), a metal outer tube (9) and super insulation (10) arranged between them. An intermediate metal tube (5), which is closed all around over its entire length, is arranged over the screen (4) while leaving a gap (6) from the cryostat (7). A medium which is fluid at room temperature, and to which a constant pressure is applied, is introduced as an impregnating medium for the dielectric (3) into the space between the conductor (2) and the intermediate tube (5), and at least one refrigeration unit for supplying a liquid refrigerant is connected to the gap (6) between the cryostat (7) and the intermediate tube (5).

5 Claims, 2 Drawing Sheets

SYSTEM HAVING A SUPERCONDUCTIVE CABLE

RELATED APPLICATION

This application is claims the benefit of priority from European Patent Application No. 06290934.6, filed on Jun. 7, 2006, the entirety of which is incorporated herein by reference.

DESCRIPTION

1. Field of the Invention:

The invention relates to a system having a superconductive cable which comprises a superconductive conductor, a dielectric enclosing the latter and a superconductive screen which is arranged over the dielectric acting as a spacer, and which is enclosed with the inclusion of an air gap by a cryostat which consists of a metal inner tube, a metal outer tube and super-insulation arranged between them, wherein space for conveying a liquid refrigerant is provided between the cable and the cryostat.

2. Background:

A superconductive cable has electrical conductors made of a special material, which enters the superconductive state at sufficiently low temperatures. The electrical resistance of a correspondingly constructed conductor thereby tends towards zero. Suitable materials are for example YBCO (yttrium-barium-copper oxide) or BiSCCO (bismuth-strontium-calcium-copper oxide). Sufficiently low temperatures for such material to achieve the superconductive state lie, for example, between 67 K and 110 K. Suitable refrigerants are for example nitrogen, helium, neon and hydrogen or mixtures of these substances, respectively in the liquid state.

A superconductive cable, in which the refrigerant also penetrates into the dielectric during operation, is referred to as a cold-dielectric cable. It is distinguished in that very high powers can be transmitted in the high-voltage range. Such a cable consists of an inner conductor and an outer conductor arranged concentrically therewith, which are separated from each other and kept at a distance by a dielectric (insulation). Both conductors consist, for example, of strips of superconductive material such as YBCO or BISCCO, which are wound close together with a long pitch around a support. The support for the inner conductor—hereafter referred to as the "conductor"—may be a tube or cord or strand made of metal. For the outer conductor—hereafter referred to as the "screen"—the dielectric serves as a support. The dielectric consists, for example, of a multiplicity layers of paper and/or paper laminated with polypropylene. Around the cable, for thermal insulation and to complete the system, while including an air gap, a cryostat is arranged which comprises two metal tubes lying inside one another, between which so-called superinsulation is arranged. In the space between the two tubes of the cryostat, there is a vacuum.

In the known system with a superconductive cable according to WO 03/052775, as mentioned in the introduction, a liquid refrigerant is fed through the cryostat. It flows around the cable and cools it. When the system is being set up, the refrigerant gradually penetrates through the screen of the cable into its dielectric. It thereby also acts as an impregnating medium for the dielectric. The pressure of the refrigerant flowing through the system decreases with an increasing distance from the input point. At the same time its temperature increases—likewise with an increasing distance from the input point. This may cause the evaporation temperature of the refrigerant to be reached, so that it passes from the liquid state to the gaseous state. As a result of this, the electrical insulating properties of the dielectric may be weakened, which can lead to breakdowns between the conductor and the screen and therefore to destruction of the cable. The described effect limits the length of a safely operable system with a superconductive cable.

OBJECTS AND SUMMARY

It is an object of the invention to configure the system presented in the introduction, so that its length can be increased without entailing the risk of breakdowns between the conductor and the screen of the cable.

This object is achieved according to the invention in that an intermediate metal tube, which is closed all around over its entire length, is arranged over the screen while leaving a gap from the cryostat, in that a medium which is fluid at room temperature, and to which a constant pressure is applied, is introduced as an impregnating medium for the dielectric into the space between the conductor and the intermediate tube, and in that at least one refrigeration unit for supplying the liquid refrigerant is connected to the gap between the cryostat and the intermediate tube.

With such a structure of the system having a superconductive cable, the pressure of the medium serving as an impregnating medium for the dielectric can be kept sufficiently highly constant over a large length. The temperature in the refrigerant and the impregnating medium does in fact still increase with an increasing distance from the input point of the refrigerant. Owing to the constant pressure in the impregnating medium, however, its dielectric insulating properties are kept so constant that breakdowns no longer occur between the conductor and the screen. Owing to the separation of the refrigerant and impregnating medium and embedding of the cable in the intermediate tube, the pressures in the impregnating medium and in the refrigerant are mutually independent at any position in the system. The limits for pressure and temperature of the refrigerant can therefore be widened, and the cable and thus the system can be made substantially longer than previously, before re-cooling may need to be carried out. A cost-effective material may optionally furthermore be used as a moving refrigerant, since its dielectric insulating properties are not important for the system.

For further extension of a system equipped with a cable, two or more refrigeration units may furthermore be connected along it, without intervention in the cable itself and without interrupting it.

BRIEF DESCRIPTION OF THE DRAWINGS

An exemplary embodiment of the subject-matter of the invention is represented in the drawings.

DETAILED DESCRIPTION

Figure 1:
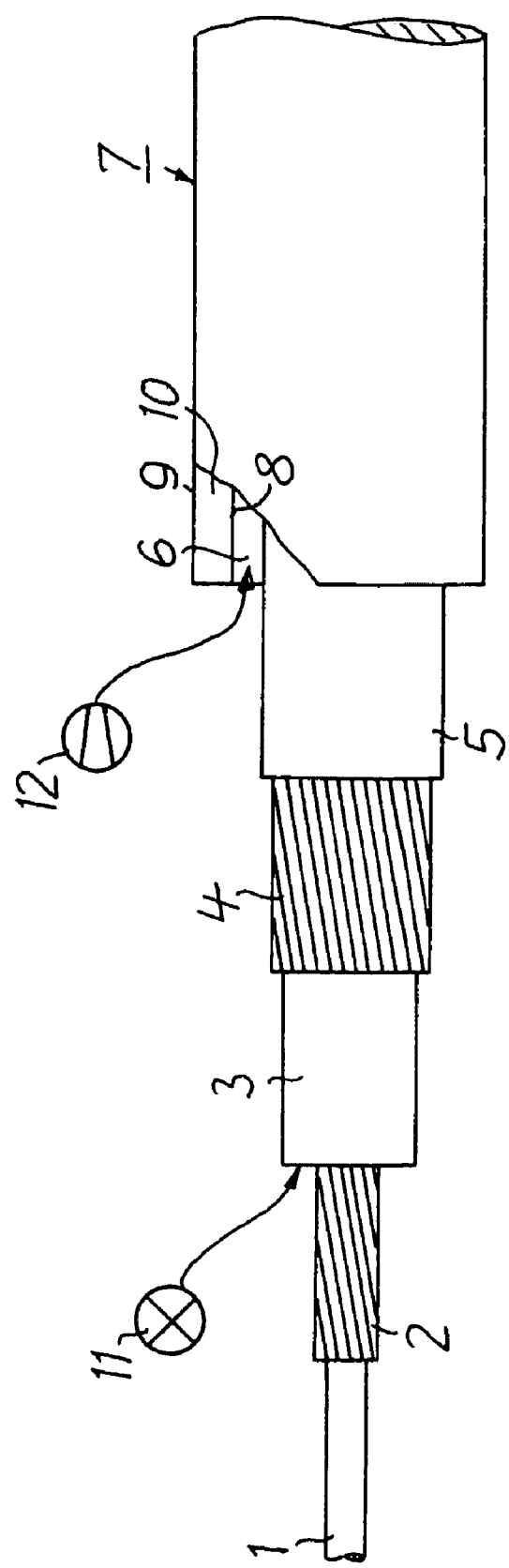
FIG. 1 shows a side view of the system according to the invention with successively removed layers.
Figure 2:
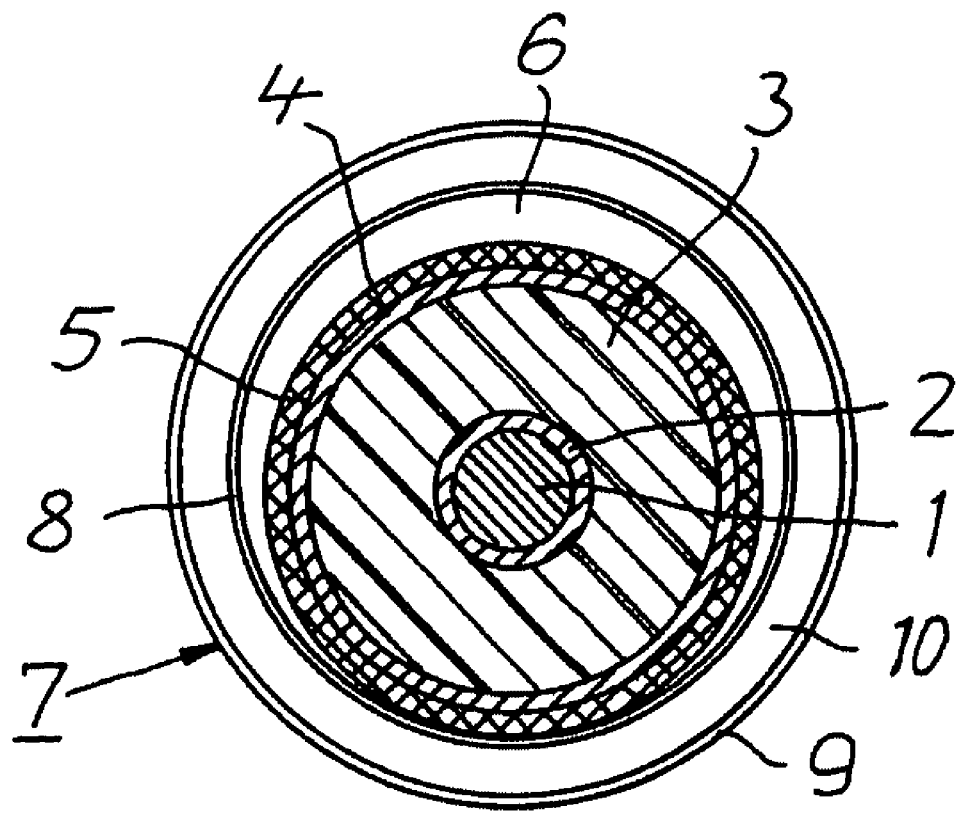
FIG. 2 shows a section through FIG. 1 along the line II-II in an enlarged representation.

A metal support, which may for example be a copper cable, is denoted by 1. The support 1 may, however, also be a differently constructed cord or a tube. Arranged around the support 1 there is a superconductive conductor 2, which advantageously consists of strips that are wound mutually parallel and close together around the support 1 with a large pitch. The conductor 2 is enclosed by a dielectric 3, which advantageously consists of a multiplicity of layers of paper and/or paper laminated with polypropylene. Arranged around the dielectric 3, there is a superconductive screen 4. This is constructed similarly as the conductor 2. Its strips are wound around the dielectric 3 acting as a support. As separate layers, the conductor 2 and the screen 4 comprise so-called conductor smoothings which are known per se and for the sake of clarity are not included in the representation. The same applies for other possible layers between the conductor 2 and the screen 4.

The superconductive cable consisting of the elements 1 to 4 is surrounded over its entire length by an intermediate metal tube 5 closed all around. Over the intermediate tube 5, while leaving a gap 6, a cryostat 7 is arranged which consists of a metal inner tube 8, and metal outer tube 9 and superinsulation 10 arranged between these two tubes, which are preferably arranged concentrically with one another. The space between the two tubes is evacuated.

The space enclosed by the intermediate tube 5 is filled with medium which is fluid, preferably liquid at room temperature as an impregnating medium, to which a constant pressure is applied for example by means of two compensating vessels 11 which are arranged at the two ends of the cable. Such compensating vessels are known per se. The liquid impregnating medium contained therein is exposed to a gas at a high pressure. In order to maintain the constant pressure of the impregnating medium, the intermediate tube 5 may also be sealed at one end, so that only one compensating vessel 11 is required at its open end, as indicated in FIG. 1. The impregnating medium should have good electrical properties and an evaporation temperature which corresponds at least to that of the refrigerant. It is advantageously higher than the evaporation temperature of the refrigerant. Suitable materials for the impregnating medium are for example nitrogen and oil.

A gas, for example SF6, which is liquid or solid at the operating temperature of the cable or the system, may also be used as a medium which is fluid at room temperature. For such a medium, the same as described above for a liquid medium also applies.

A liquid refrigerant is pumped through the gap 6 between the inner tube 5 and the cryostat 7, specifically by means of a refrigeration unit indicated by a pump 12. In the case of a longer system, two or more refrigeration units may also be used for re-cooling the refrigerant. By means of the refrigeration unit or refrigeration units, the required temperature and the required pressure of the refrigerant are maintained in the gap between the cryostat 7 and the intermediate tube 5, without intervening in the cable itself.

The intermediate tube 5 may be configured as a smooth tube or as a corrugated tube with corrugation extending transversely to its longitudinal direction. It may bear directly on the screen 4. There may nevertheless also be a separating layer between the screen 4 and the intermediate tube 5. The intermediate tube 5 advantageously consists of Invar steel, which does not substantially change its temperature in the event of temperature variations.

The invention claimed is:

1. A superconductive cable comprising:
   a superconductive conductor,
   a dielectric enclosing said superconductive conductor; and
   a superconductive screen arranged over said dielectric, acting as a spacer,
   an intermediate metal tube, which is closed all around over its entire length, arranged over the screen; and
   a cryostat, which has a metal inner tube a metal outer tube and superinsulation arranged between them, encloses said intermediate metal tube, with a gap between said metal inner tube of said cryostat and said intermediate metal tube, said gap for conveying a cooling medium;
   wherein an impregnating medium, which is fluid at room temperature, and to which a constant pressure is applied, is introduced as an impregnating medium for said dielectric into a space between said superconductive conductor and said intermediate tube, and
   wherein at least one refrigeration unit, for supplying said cooling medium, is connected to said gap between said cryostat and said intermediate metal tube.

2. System according to claim 1, wherein said intermediate metal tube is made from Invar steel.

3. System according to claim 1, wherein said intermediate metal tube is a smooth tube.

4. System according to claim 1 wherein said intermediate metal tube is a corrugated tube, with corrugation extending transversely to its longitudinal direction.

5. System according to claim 1, wherein the two or more refrigeration units for re-cooling said cooling medium are arranged along it.

* * * * *